UNITED STATES PATENT OFFICE.

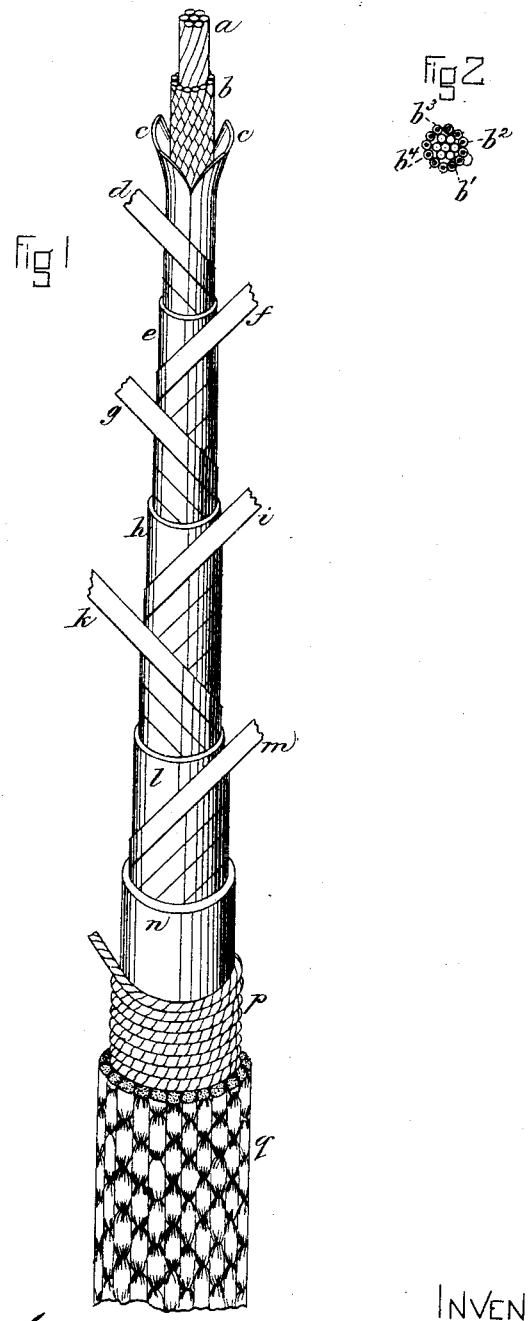

HENRY C. SPALDING, OF BOSTON, MASSACHUSETTS.

ANTI-INDUCTION ELECTRIC CABLE.

SPECIFICATION forming part of Letters Patent No. 327,487, dated September 29, 1885.

Application filed December 7, 1883. Renewed February 28, 1885. (No model.)

*To all whom it may concern:*

Be it known that I, HENRY C. SPALDING, a citizen of the United States, and a resident of Boston, in the county of Suffolk and State of Massachusetts, have invented certain new and useful Improvements in Anti-Induction Electric Cables, of which the following is a specification, reference being had to the drawings accompanying and forming a part of the same.

In other applications filed by me, noticeably in that numbered 113,231, I have shown and described an electric cable consisting of a central conducting-core surrounded by layers of fibrous insulating material and metal alternately disposed, the whole bound with a serving of twine, and inclosed in an armor or jacket of wires. The great tensile strength which cables for submarine use must possess is attained in the cases referred to mainly by the use of the armor or exterior jacket of wires, and this plan is that commonly adopted for the purpose. Cables have, however, been constructed heretofore in which a central strengthening-core has been used; but so far as I am aware no construction has been as yet proposed which secures for submarine cables the necessary strength without adding too greatly to their bulk or diameter.

My objects in the present invention are, mainly, to produce a cable with a central strengthening-core, which shall possess the requisite tensile strength with a comparatively small amount of material, and also to prevent the effects of induction and retardation. To this end I combine with a central core composed of twisted wires of iron or steel, insulated conductors, part for the passage of the current, and part for intercepting currents induced in one which would otherwise be manifested in another, and these conductors I inclose by successive layers of insulating material and metal, employing for this purpose the materials and plan of construction invented by me, and described more particularly in my said application No. 113,231.

In the accompanying drawings my improvements are illustrated, and reference will be made thereto for a more detailed description of the features of novelty involved.

Figure 1 is a view of a section of my improved cable, showing parts of the successive layers. Fig. 2 is a section of the central core and the conductors surrounding the same.

The letter $a$ designates the core, which is composed of a rope of twisted steel or iron wires. Around these wires a number of insulated copper wires, $b$, are laid or wound, preferably in a long spiral, as indicated in the drawings. Around these wires are applied two oppositely-laid strips of plastic material, $c$, such as gutta-percha or caoutchouc, or like material, which by compression may be caused to enter the depressions and irregularities in the surface of the core made up of the wires $a$ and $b$, and form a smooth and round surface for the succeeding layers. Around the material $c$ is wound a spiral strip of metal foil, $d$, and then follow, as in the cables described in my application to which reference has already been made, a coating of resinous varnish, $e$, a strip of paper, $f$, wound spirally on the varnish, a layer of metal, $g$, spirally wound, a second layer of paper, $i$, a third layer of metal, $k$, a coating of varnish, $l$, and a final layer of paper, $m$. This completes the cable so far as the tensile strength and means for preventing induction and retardation are concerned. In order to render it more compact and protect it from abrasion, a coating of a viscous bituminous substance, $n$—such as pure Trinidad asphalt and petroleum residue—is applied over the coating $m$, and on this is wound a stout twine, $p$, which becomes thoroughly saturated with the material $n$. The whole is inclosed in a braided jacket, $q$, for which I prefer strong twine saturated with tar or viscous asphalt, or coated with these materials after it has been applied.

With reference to the mechanical construction of the cable, it is evident that the materials used and the disposition of the several parts conduce to giving great tensile strength, flexibility, and durability. In its electrical qualities it presents the following features of novelty: Of the insulated conductors a certain number are "dead"—that is, they are not designed to be connected with any battery. The remainder form the leading and return conductors of independent circuits. Two wires, or two pairs of wires, may be utilized for each circuit. In either event a dead wire will be interposed between the conductors of each circuit. For instance, in Fig. 2, $b'$, $b^2$, $b^3$, and $b^4$ represent the dead wires, the remainder the useful wires of the circuits. The wires $b'$ $b^2$, &c., may be grounded at one or more points. The metal sheaths or screens, combined with this system of conductors, prevent any retardation. I thus obtain a multiple cable, or one containing a number of circuits, which has great strength and durability, and in which the objectionable effects of retardation, to which similar cables are exposed, are obviated.

What I claim as my invention is—

1. In an electrical cable, the combination, with a central core composed of twisted iron or steel wires, of a group of insulated conductors, part of which form the leading and return wires of electric circuits, the remainder being dead or not connected with a battery, and layers of insulating material and of metal surrounding the conductors, substantially as herein set forth.

2. In an electrical cable, the combination of a central core composed of twisted steel or iron wires, insulated conductors laid spirally thereon, a coating of plastic material inclosing the conductors, alternate layers of insulating material and metal applied around said plastic material, and a braided jacket or cover, all as set forth.

3. In an electrical cable, the combination of a central core composed of twisted iron or steel wires, insulated electrical conductors laid spirally around the core, part of said conductors being dead, or not connected with a battery, and, interposed between conductors of separate circuits, layers alternately of insulating material and metal inclosing the conductors, and a braided jacket or cover for protecting the same from abrasion, as and for the purpose specified.

In witness whereof I have hereunto signed my name in the presence of two subscribing witnesses.

HENRY C. SPALDING.

Witnesses:
ALEXANDER L. HAYES,
E. B. WELCH.